United States Patent [19]

Fujibayashi

[11] 4,431,284
[45] Feb. 14, 1984

[54] LIGHT MEASURING DEVICE FOR CAMERA

[75] Inventor: Kazuo Fujibayashi, Kanagawa, Japan

[73] Assignee: Canon Kabushiki Kaisha, Tokyo, Japan

[21] Appl. No.: 356,513

[22] Filed: Mar. 9, 1982

[30] Foreign Application Priority Data

Mar. 20, 1981 [JP] Japan .................................. 56-41125

[51] Int. Cl.³ ................................................ G03B 7/08
[52] U.S. Cl. .................................... 354/413; 354/127.1
[58] Field of Search .......................... 354/23 R, 59, 154

[56] References Cited

U.S. PATENT DOCUMENTS 3,791,276 2/1974 Ueda et al. ........................ 354/23 R
3,868,703 2/1975 Ueda ................................... 354/154
4,065,777 12/1977 Maitani et al. ..................... 354/23 R
4,097,876 6/1978 Uno et al. ............................ 354/154

FOREIGN PATENT DOCUMENTS 2900606 7/1979 Fed. Rep. of Germany ........ 354/59
2918647 11/1980 Fed. Rep. of Germany .... 354/23 R
55-120014 9/1980 Japan ..................................... 354/59

Primary Examiner—Russell E. Adams
Attorney, Agent, or Firm—Toren, McGeady and Stanger

[57] ABSTRACT

A light measuring device for camera so designed that by placing a plate whose reflection factor is different from that of the shutter curtain in front of the shutter curtain the distribution of the reflection factor of the shutter curtain is varied so as to vary the distribution of the light measurement.

3 Claims, 6 Drawing Figures

LIGHT MEASURING DEVICE FOR CAMERA

BACKGROUND OF THE INVENTION

1. Field of the Invention

The present invention relates to a light measuring device for camera making use of the light reflected on the plane of the focal plane shutter.

2. Description of Prior Arts

Until now in order to measure the brightness of the object of the single lens reflex camera, the light split in the finder, the light dispersed on the focusing plate or the light reflected on the film plane is mainly made use of. However, when the light split in the finder view field is used, there takes place a dark spot in the finder view field, while when the light dispersed on the focusing plate is used, a sufficient light amount for carrying out the precise light measurement cannot be obtained because the focusing plate itself has the dispersing characteristics, which is inconvenient. Further, when the light reflected on the film plane is used, a precise light measurement cannot be expected because the intensity of the reflected light depends upon the reflecting characteristics of the film itself. Further, it is often necessary to change over the light measuring ranges, for example, the average light measurement or the light measurement with priority on particular portion, for which the mechanically and electrically complicated mechanism becomes needed.

SUMMARY OF THE INVENTION

An object of the present invention is to provide a light measuring device for camera making use of the light reflected on the focal plane shutter, whereby the change over of the light measurement distribution can be carried out easily.

In order to obtain the above-mentioned purpose, in case of the light measuring device of the present invention, the distribution of the light reflected on the focal plane shutter is varied. Hereby, the change of the distribution of the light reflected on the shutter curtain is carried out by means of a light shading member, which is inserted in front of the shutter curtain in order to cover at least a part of the shutter curtain. Hereby, this light shading member may have an even transmission or reflection factor or may have the distribution of a transmission or reflection factor. The non-reflecting light shading member which is arranged in the optical path between the photographing lens and the shutter curtain projects a shadow on the shutter curtain so as to vary the distribution of the light on the shutter curtain, with the result that a different distribution of the light reflected on the shutter curtain is formed. The non-reflecting light shading member which is arranged in the optical path between the photographing lens and the shutter curtain and whose reflecting factor is different from that of the shutter curtain directly reflects the light advancing toward the shutter curtain and orientates the light whose amount corresponds with the reflecting factor toward the light sensing member. Namely, the same effect that the reflecting factor of a part of the shutter curtain is changed can be obtained. The light shading member arranged between the shutter curtain and the light sensing means partially attenuates or shades the light reflected on the shutter curtain so as to realize a different light distribution.

DESCRIPTION OF THE PREFERRED EMBODIMENTS

Figure 1:
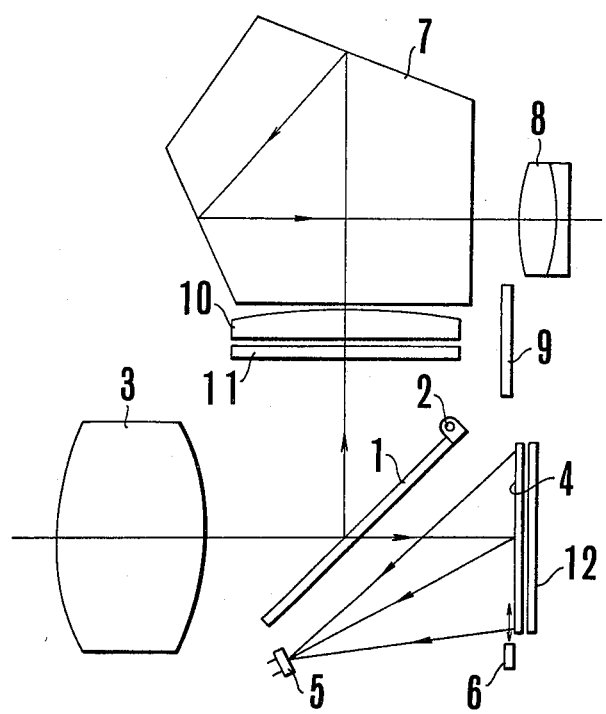
FIG. 1 shows the construction of an embodiment of the light measuring device of the present invention for camera.

Below the present invention will be explained in detail in accordance with the drawings of the embodiments hereof.

In the drawing, 1 is the movable mirror rotatable around the horizontal axis 2, whereby the whole surface is semitransparent in such a manner that a part of the photographing light coming from the photographing lens 3 reaches the shutter curtain through the movable mirror 1. The light sensing element 5 is arranged on the bottom of the mirror box so as to face to the shutter curtain 4, whereby the surface of the shutter curtain 4 is properly roughed so as to orientate the principal component of the light reflected on the shutter curtain 4 toward the light sensing element 5, while the reflection characteristics of the surface of the shutter curtain 4 is adjusted in such a manner that an even distribution of the measuring light can be obtained regardless of the distance up to the light sensing element 5. Further, for example, a light absorbing black member 6 whose reflection characteristics is different from that of the shutter curtain 4 is arranged in front of the shutter curtain 4 by means of the link mechanism so as to be brought in or out at a predetermined timing. For example, it is brought in synchronization with the rotation of the movable mirror 1 and out immediately before the movement of the shutter curtain. Further, the eye piece shutter 9 can be inserted between the pentagonal prism 7 and the eye piece lens during the photographing in such a manner that the light does not enter into the mirror box through the eye piece lens 8, the pentagonal lens 7, the condenser lens 10, the focusing plate 11 and the semitransparent movable mirror 1. Further, 12 is the plane of the film behind the shutter curtain 4.

Consequently, in the state the movable mirror 1 is lowered before the photographing the photographing light from the object is slantly incident upon the movable mirror 1 through the photographing lens 3. The incident light is divided into two parts by means of the movable mirror, whereby the one light beam is visually recognized as the object image through the focusing plate 11, the condenser lens 10, the pentagonal prism 7 and the eye piece lens 8. Further, the light passing through the movable mirror 1 forms an image on the shutter curtain 4 and is reflected toward the light sensing element 5, which carries out the average light measurement over the whole picture plane. The light measurement in this state has the light measurement sensitivity distribution characteristics, almost that of the average light measurement, as is shown in FIG. 2(a), whereby the ordinate represents the position of the picture plane, while the abscissa represents the intensity i of the light incident upon the light sensing element 5.

Figures 2A, 2B, 2C:
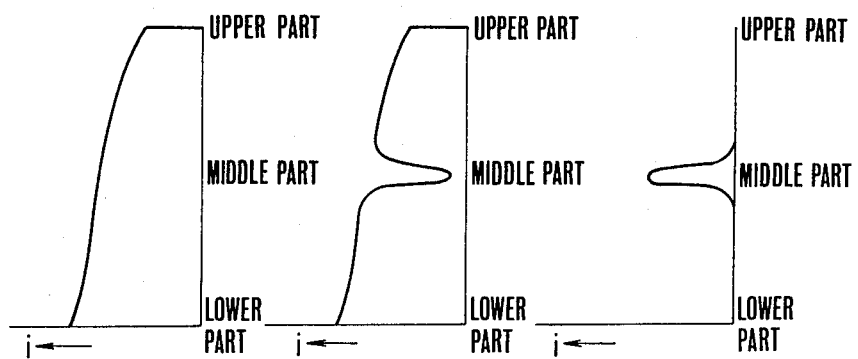
FIGS. 2(a), (b) and (c) show characteristics of the light measurement sensitivity distribution.
Figure 3:
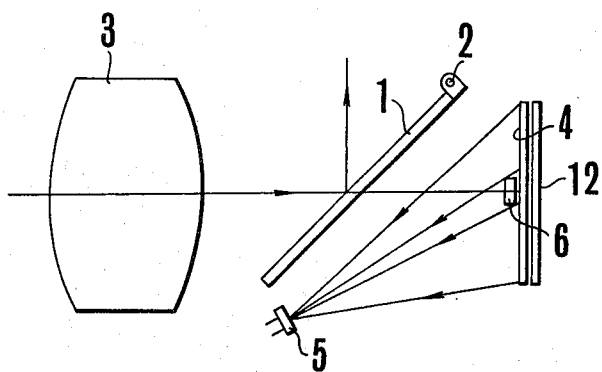
FIG. 3 shows the state of the light absorbing member is moved in front of the shutter curtain.

When the light absorbing member 6 moves up to the middle of the shutter curtain 4 as is shown in FIG. 3, the light which has reached the light absorbing member 6 out of the light advancing from the movable mirror 1 to the shutter curtain is absorbed so that the light sensing element 5 is given the light measuring sensitivity distribution characteristics as is shown in FIG. 2(b), whereby the intensity i of the light incident upon the part corresponding to the light absorbing member is attenuated. Consequently, the light measuring state shown in FIG. 1 and that shown in FIG. 3 are changed over and the intensity shown in FIG. 2(b) is deducted from that shown in FIG. 2(a), the characteristics as is shown in FIG. 2(c) can be obtained. This characteristics is nothing but the light measurement with priority on the central part, namely the measurement of the light in the central part in the picture plane, whereby the light absorbing member 6 is placed.

When by inserting the light absorbing member 6 in this way, the difference between the intensity of the light incident upon the light sensing element 5 at the existence of the light absorbing member 6 and the intensity at the non-existence of the light absorbing member 6 is obtained, it is possible to obtain the light measurement with priority on the central part, whereby when the light absorbing member 6 is not inserted at all, it is of course possible to obtain the average light measurement. The change over of the above light measurement systems is easy.

In case of this light measuring device regardless of the existence of the non-existence of the light absorbing member 6 the light sensing element 5 senses the light reflected from the whole picture plane and therefore the light intensity is so large that the stabilized range of the characteristics of the light sensing element 5 can be made use of. Consequently, the accuracy of the two kinds of the output is very high and the difference, namely the value of the light measurement with priority on the middle part is by far high in accuracy than the single spot partial light measurement. Further, the movable mirror 1 has the even semitransparence all over the plane there takes place no dark portion in the finder view field during the light measurement, so that the object image in the eye piece lens 8 is easy to observe.

Figure 4:
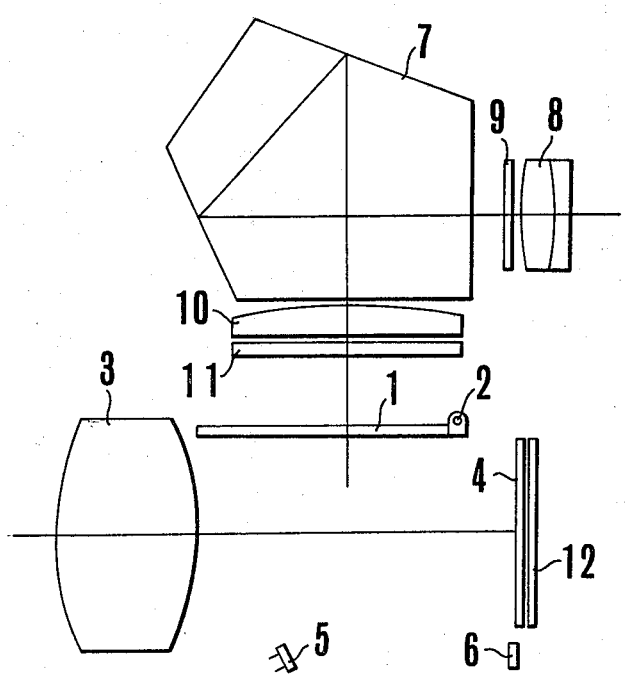
FIG. 4 shows the state during the photographing.

FIG. 4 shows the state during the photographing. During the photographing the light absorbing member 6 is no more in front of the shutter curtain 4. Because the movable mirror 1 has the transparency as is shown in the drawing, the eye piece shutter 9 is inserted between the pentagonal prism 7 and the eye piece lens 8 in order to prevent the invasion of the stray light into the mirror box through the eye piece lens 8, the pentagonal prism 7 and the movable mirror 1.

The sequence of the light measurement in FIG. 1 and that in FIG. 3 for carrying out the light measurement with priority on particular portion can be chosen optionally at the designing. There is no disadvantage even if at first the light absorbing member 6 is inserted so as to obtain the characteristics shown in FIG. 2(b) and then the member is withdrawn so as to obtain the characteristics shown in FIG. 2(a). Further, the light absorbing member 6 need not to be positioned in the middle of the picture plane but at any position. Further, the surface of the light absorbing member 6 need not to have an even light absorbing characteristics, but the distribution of the absorbing characteristics can be partially varied.

Further, as has been explained so far, in case of the light measuring device in accordance with the present invention the light member whose reflection characteristics is different from that of the shutter curtain is inserted and withdrawn in front of the shutter curtain so as to realize the partial light measurement by means of the difference of the light reflected on the shutter curtain, so that the change over between the even light measurement and the partial light measurement can easily be carried out. Further, the reflection characteristics of the shutter curtain is so stable that the value of the light measurement can be obtained accurately, which is advantageous.

What is claimed is:

1. A light measuring device for camera comprising:
   a photographing optical system;
   a shutter curtain arranged in the neighborhood of the image plane of the photographing optical system;
   a light sensing means for sensing the light from the shutter curtain; and
   a light shading member for covering at least a part of the shutter curtain, said member freely inserted or withdrawn.

2. A device in accordance with claim 1, wherein the light shading member having a reflecting factor different from that of the shutter curtain.

3. A light measuring device for camera comprising:
   a photographing optical system;
   a shutter curtain arranged in the neighborhood of the image plane of the photographing optical system;
   a light shading member for covering at least a part of the shutter curtain, said member being freely inserted or withdrawn;
   a light sensing means for sensing the light from the shutter curtain when the light shading member is inserted and when the light shading member is not inserted so as to give the respective output of the light measurement value; and
   a calculator for calculating the light measurement value when the light shading member is inserted and when the light shading member is not inserted.

* * * * *